United States Patent  (10) Patent No.: US 10,372,412 B2
Klein et al.  (45) Date of Patent: Aug. 6, 2019

(54) FORCE-BASED INTERACTIONS WITH DIGITAL AGENTS

(71) Applicant: Microsoft Technology Licensing, LLC, Redmond, WA (US)

(72) Inventors: Christian Klein, Duvall, WA (US); Callil R. Capuozzo, Brooklyn, NY (US); Brendan D. Elliott, Redmond, WA (US); Christopher M. Barth, Seattle, WA (US); Otso Joona Casimir Tuomi, Seattle, WA (US); Shuo Shen, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 255 days.

(21) Appl. No.: 15/334,153

(22) Filed: Oct. 25, 2016

(65) Prior Publication Data

US 2018/0113672 A1 Apr. 26, 2018

(51) Int. Cl.
*G06F 3/01* (2006.01)
*G06F 3/16* (2006.01)
(Continued)

(52) U.S. Cl.
CPC ............ *G06F 3/167* (2013.01); *G06F 3/0414* (2013.01); *G06F 3/04883* (2013.01); *G10L 15/18* (2013.01); *G10L 15/183* (2013.01); *G06F 3/017* (2013.01); *G06F 3/0482* (2013.01); *G06F 3/0488* (2013.01); *G06F 17/279* (2013.01);
(Continued)

(58) Field of Classification Search
CPC ... G01L 2015/223; G01L 15/20; G01L 15/22; G01L 15/1815; G06F 3/167; G06F 3/0488; G06F 3/0482; G06F 3/017; G06F 17/279; G06F 17/30713
See application file for complete search history.

(56) References Cited

U.S. PATENT DOCUMENTS 8,731,942 B2  5/2014  Cheyer et al.
8,838,072 B2  9/2014  Sawhney et al.
(Continued)

OTHER PUBLICATIONS

Wang, et al., "ForceExtension: Extending Isotonic Position-controlled Multi-touch Gestures with Rate-controlled Force Sensing for 3D Manipulation", In Proceedings of IEEE Symposium on 3D User Interfaces, Mar. 16, 2013, pp. 3-6.
(Continued)

*Primary Examiner* — Quoc A Tran

(57) ABSTRACT

Embodiments relate to enabling force-based interactions with an intelligent personal assistant (IPA). A computing device capable of sensing the force exerted to input touch inputs is configured with a pressure-based filter that checks pressures of touch inputs to determine which touch inputs are to be diverted to the IPA or which are to be passed on to underlying user interface that is not related to the IPA. Touch inputs designated for the IPA based on their pressure characteristics can become part of the context of the IPA. Some IPA uses of the touch inputs include selecting graphic objects on the display, resolving exophoric phrases (e.g., "that", "those") as referring to such selected graphic objects, displaying transient user interface to provide information about (or actions for) the selected object, incorporating a selected object into the current context of the IPA, etc.

20 Claims, 11 Drawing Sheets

(51) Int. Cl.
*G06F 17/27* (2006.01)
*G06F 3/041* (2006.01)
*G10L 15/18* (2013.01)
*G10L 15/22* (2006.01)
*G06F 3/0482* (2013.01)
*G06F 3/0488* (2013.01)
*G10L 15/183* (2013.01)
*G06F 17/00* (2019.01)

(52) U.S. Cl.
CPC ............... *G06F 2203/04108* (2013.01); *G10L 2015/223* (2013.01)

(56) References Cited

U.S. PATENT DOCUMENTS

| | | | |
|---|---|---|---|
| 8,965,922 | B2 | 2/2015 | Kandogan et al. |
| 9,015,099 | B2 | 4/2015 | Nitz et al. |
| 9,189,742 | B2 | 11/2015 | London |
| 2010/0238126 | A1 | 9/2010 | Chen et al. |
| 2013/0278520 | A1 | 10/2013 | Weng et al. |
| 2014/0101545 | A1* | 4/2014 | Paek .................. G06F 3/016 715/702 |
| 2014/0258324 | A1 | 9/2014 | Mauro et al. |
| 2014/0362024 | A1 | 12/2014 | Hicks |
| 2014/0368436 | A1* | 12/2014 | Abzarian ............. G06F 3/0488 345/168 |
| 2015/0193031 | A1 | 7/2015 | Tilak et al. |
| 2015/0199017 | A1 | 7/2015 | Murillo et al. |
| 2015/0286698 | A1 | 10/2015 | Gagnier et al. |
| 2015/0324041 | A1* | 11/2015 | Varley .................. G06F 3/0412 345/173 |
| 2016/0371340 | A1* | 12/2016 | Waltermann ...... G06F 17/30867 |

OTHER PUBLICATIONS

Rendl, et al., "Presstures: exploring pressure-sensitive multi-touch gestures on trackpads", In Proceedings of the SIGCHI Conference on Human Factors in Computing Systems, Apr. 26, 2014, pp. 431-434.

Huang, et al., "Enabling Context-Aware Agents to Understand Semantic Resources on the WWW and the Semantic Web", In Proceedings of the IEEE/WIC/ACM International Conference on Web Intelligence, Sep. 20, 2004, 7 pages.

Campbell, Mikey, "Watch Effect: Flow the Digital Crown and Force Touch could inform future iOS device design", Published on: May 25, 2015 Available at: http://appleinsider.com/articles/15/05/25/watch-effect-how-the-digital-crown-and-force-touch-could-inform-future-ios-device-design.

Balinsky, et al., "Intelligent Assistant for Context-Aware Policies", In Proceedings of IEEE 10th International Conference on Trust, Security and Privacy in Computing and Communications, Nov. 16, 2011, pp. 621-630.

"International Search Report and Written Opinion Issued in PCT Application No. PCT/US2017/056704", dated Feb. 12, 2018, 15 Pages.

* cited by examiner

USING DIRECTION

MULTIPLICITY

FORCE-BASED INTERACTIONS WITH DIGITAL AGENTS

BACKGROUND

A convergence of maturing software technologies has enabled intelligent personal assistants (IPAs) to become practical for everyday use. Speech recognition accuracy, machine learning, and quick access to diverse data have been combined to make it possible for IPAs to understand and execute complex voice commands (as used herein, "command" refers to both directives and questions). Some well-known IPAs are Siri™ by Apple, Google Now (or Google Assistant)™, Amazon's Alexa™, Microsoft's Cortana™, Facebook's M™, Sirius (open source), among others.

While IPAs continue to improve in general capability, these agents have limited understanding of context as it applies to specific objects on a display of a device on which an IPA is executing (or at least some portion thereof, such as a front-end). Presently, to refer to specific on-screen objects, a user must describe properties of an object (e.g., a name) to specify a particular objector. Experimental IPAs have enabled verbose redundant descriptions of locations to specify objects. A user might speak a description such as "send the third object from the upper left corner", "open the icon that is second from the bottom fourth from the right", or "share the picture of my cat wearing a hat". Such descriptive phrases can be tedious for a user to formulate and are often difficult for an IPA to interpret. Some IPAs are able to infer context for voice commands from information shown on the screen. However, this approach involves attempting to enumerate all objects of interest and is unable to specify context for particular objects. In addition, this approach is particularly limiting on larger devices or in multitasking scenarios where the object the user may be referring to (e.g. when speaking the command "share this") is highly ambiguous. Some IPAs analyze whatever is on-screen and make inferences and assumptions about the objects based on properties of the objects and perhaps other factors such as recent use activities or targets thereof. This heuristic guesswork often fails to recognize the user's intended target. None of the prior approaches for determining which on-screen object a user is referring to have involved explicit manual (i.e., touch) designation. As a result, IPAs end up providing limited value to users as part of existing task flows.

It might appear convenient to use non-speech forms of user input to specify objects to an IPA, for instance touch inputs. However, most operating systems are already designed to handle touch inputs in pre-defined ways. A touch directed to an object is likely already reserved for triggering an expected response. Discussed below are techniques for enabling touch inputs to be used to specify context for IPAs without interfering with pre-existing touch functionality.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to enabling force-based interactions with an intelligent personal assistant (IPA). A computing device capable of sensing the force exerted to input touch inputs is configured with a pressure-based filter that checks pressures of touch inputs to determine which touch inputs are to be diverted to the IPA or which are to be passed on to underlying user interface that is not related to the IPA. Touch inputs designated for the IPA based on their pressure characteristics can become part of the context of the IPA. Some IPA uses of the touch inputs include selecting graphic objects on the display, resolving exophoric phrases (e.g., "that", "those") as referring to such selected graphic objects, displaying transient user interface to provide information about (or actions for) the selected object, incorporating a selected object into the current context of the IPA, etc.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
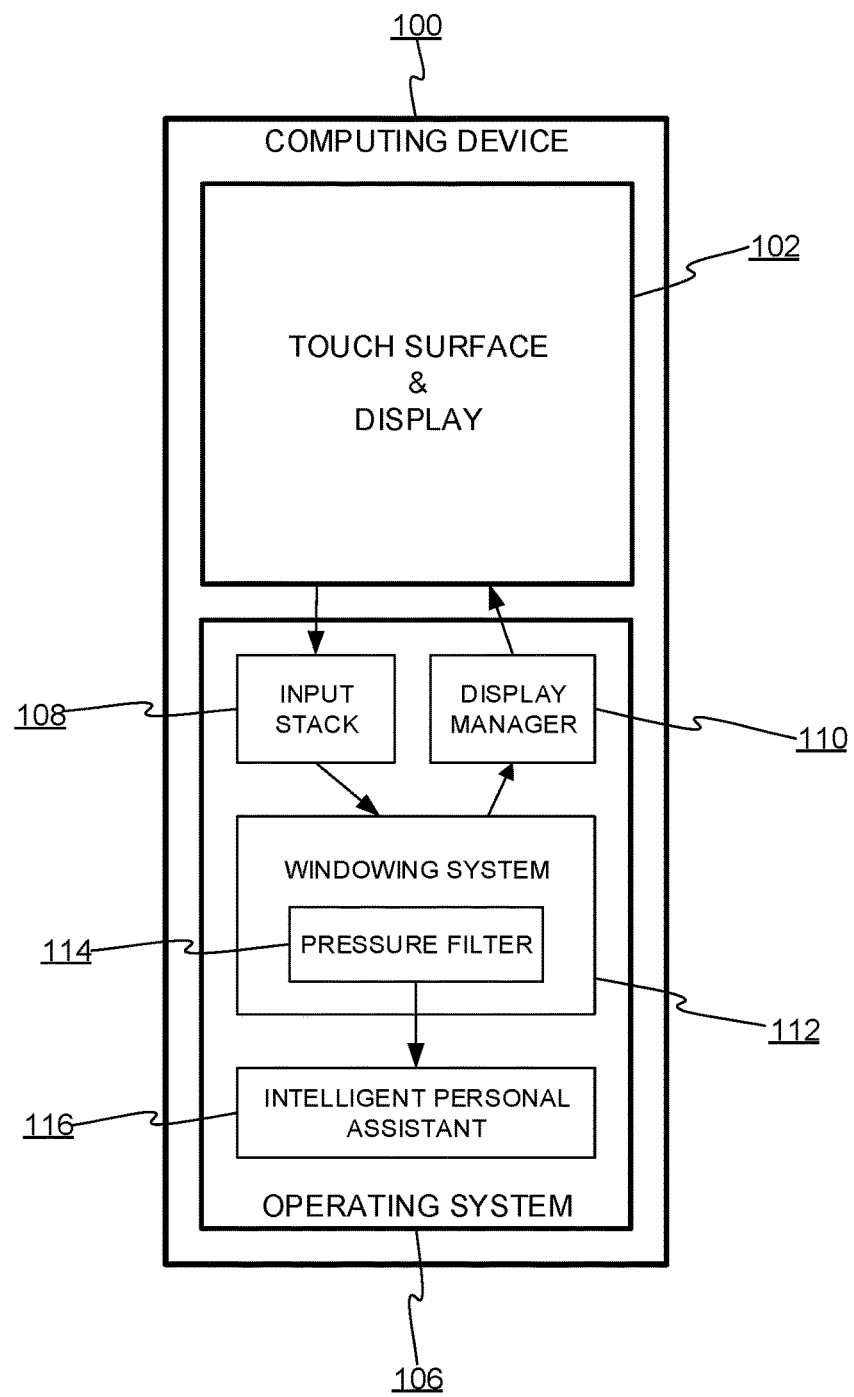
FIG. 1 shows a computing device configured to provide a user interface on a display.

FIG. 1 shows a computing device 100 configured to provide a user interface on a display 102. The display 102 has touch and pressure sensing capabilities. An operating system 106 includes an input stack 108, a display manager 110, and a windowing system 112. The input stack 108 includes device drivers and other components that receive raw pressure points from the first display 102 and convert them to a form usable by the windowing system 112. The windowing system 112 provides known functionality such as receiving pressure points and dispatching them as events to the software of corresponding windows (e.g., applications), generating the graphics for windows, etc. The display manager 110 manages the display of graphics generated by the windowing system 112 and may provide abstract display functionality for the windowing system 112 such as providing information about which displays are available and their properties.

The computing device 100 also includes a pressure filter 114 and an intelligent personal assistant 116 (IPA). The pressure filter 114 is a module in the input-handling chain that evaluates pressure features of touch inputs to "filter" or divert to the IPA 116 touch inputs that meet a pressure condition implemented by the pressure filter 114. In some embodiments, all touch inputs sensed by the display 102 are evaluated by the pressure filter 114, which functions as a gate that directs (i) touch inputs that meet the pressure condition to be received and handled by the IPA 116, and (ii) directs touch inputs that do not meet the pressure condition to be passed through to the ordinary input-handling chain of the windowing system 112, which dispatches the touch inputs to a window manager, application windows, user interface elements, or the like. The IPA 116 is a known type of software module, but modified or extended as described herein to use touch inputs to acquire context for providing information to the user and for interpreting and executing voice commands.

The breakdown of functionality of modules shown in FIG. 1 is only an example of one type of environment in which embodiments described herein may be implemented. The embodiments described herein may be adapted to any computing device that displays graphics and uses a pressure-sensitive touch surface. The term "touch" is used herein to describe points inputted by any physical implement including fingers, pens, styluses, etc.

Figure 2:
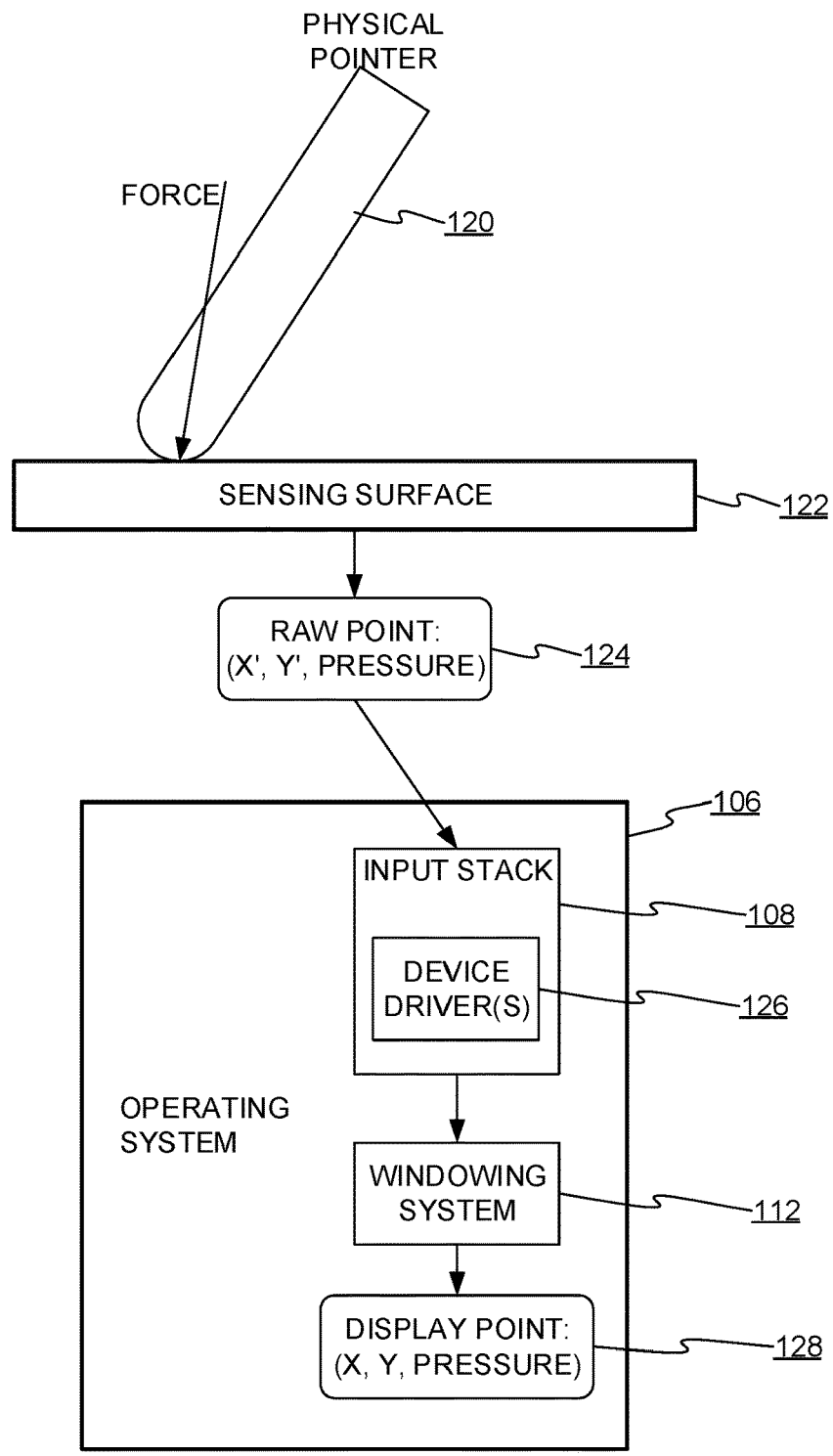
FIG. 2 shows additional details of the computing device.

FIG. 2 shows additional details of the computing device 100. When a physical pointer 120 such as a finger or stylus contacts a sensing surface 122, the sensing surface 122 generates location signals that indicate the locations of the corresponding points of the sensing surface 122 contacted by the physical pointer 120. The sensing surface 122 also generates pressure signals that indicate measures of force applied to the sensing surface 122 by the physical pointer 120. Force or pressure sensing can be implemented based on displacement of the sensing surface, the shape formed by the contact points, heat, an array of pixel-scale pressure sensors, etc. Any means of directly measuring, or indirectly estimating, the changing force of the physical pointer 120 will suffice.

The sensing surface 122 outputs raw pressure points 124, each of which has device coordinates and a measure of pressure, for instance between zero and one. The input stack 108 receives the raw pressure points 124 which are passed on by a device driver 126. At some point between the hardware stack 108 and the windowing system 112 the raw pressure points are converted to display coordinates and outputted by the windowing system 112 as input events 128 to be passed down through a chain of responders or handlers perhaps starting with the pressure filter 114 and then to through the windowing system 112 one or more applications or the IPA 116, as the case may be.

Figure 3:
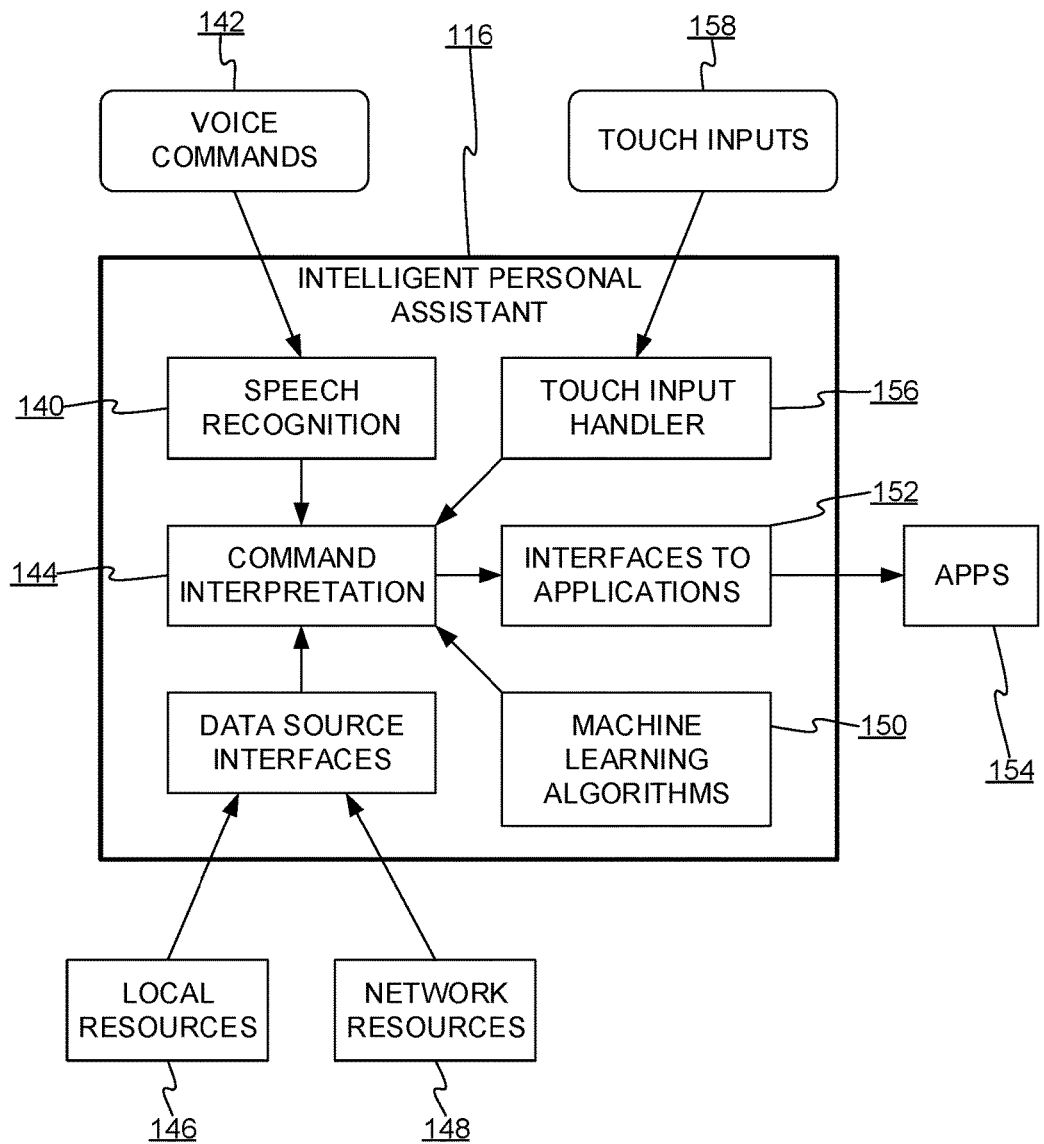
FIG. 3 shows details of an IPA.

FIG. 3 shows details of the IPA 116. As noted above, IPAs are known software elements and details for implementing same are available elsewhere. For example, source code for the Lucida IPA is available at github.com (claritylab/lucida). Generally, an IPA includes a number of functions, which might be performed locally, remotely, or both. The IPA 116 includes a speech recognition module 140. Voice commands 142 are spoken into a microphone of the computing device 100. The speech recognition module 140 (or a remote service that it communicates with) uses known speech recognition algorithms and statistical models (e.g., Gaussian Mixture Models and Hidden Markov Models) to convert the voice commands 142 into text.

The recognized text of a voice command is passed to a command interpretation module 144. The command interpretation module 144 (or a remote service equivalent), sometimes taking into account current context and recent user activities, classifies the converted text of the command as either a query for information or as a directive to perform an action. To help interpret a command and to construct a formal action for the command, the command interpretation module 144 might draw on various local data sources 146 and remote network resources 148. For example, if a command includes a proper noun, a contacts database might be consulted to obtain information about the corresponding person. Machine learning algorithms 150 may be used to infer the user intent and meaning of a command converted by speech recognition.

Generally, commands are classified by the IPA 116 as either actions to be performed or requests for information (queries). Once a command has been interpreted to a formal action or query, the command interpretation module 144 uses application programming interfaces 152 to instruct various applications 154 and network services to perform the actions and queries. In cases where an IPA is tightly integrated with the operating system, some actions/queries may also be handled by the operating system (with respect to performing actions/queries, an operating system is considered to be an "application" that is at the disposal of the IPA). The IPA 116 may provide appropriate feedback about further steps that might need to be taken, whether a command was understood or successful, and so forth.

Previously IPAs have not used touch inputs to provide context for carrying out voice commands. The IPA 116 in FIG. 3 includes a touch input handler 156 to incorporate touch inputs 158 into the voice command processing pipeline. As will be described in detail below, touch inputs can be used for exophoric resolution. That is, touch inputs can be used to link exophoric phrases such as "this", "that", "them", "those", "it", etc., to graphic objects that correspond to actionable objects stored on the computing device 100 (a "phrase", as referred to herein, is one or more words within a command). An exophoric phrase is a word or phrase in a command that references something not in the command (or in earlier or later commands). Exophoric phrases may refer to things in the past, present, or future.

Previously, it has not been possible for IPAs to resolve exophoras without verbose descriptions of the display location or identifying traits of the referenced object. As explained below, the IPA 116 is able to use touch inputs to identify a graphic object on the display, and the graphic object can in turn serve as a reference to an object that is linked to an exophora in a command. The term "object", as referred to herein, is any discrete unit managed by the operating system, a file system, an application, a graphical user shell, or other software on the computing device 100. Examples of objects are files, Uniform Resource Identifiers, messages, emails, elements in structured documents (e.g., elements of markup code), contacts, applications, user interface elements (e.g. views, containers, controls, windows) etc. Most objects are exposed to the user by respective graphic objects. The term "graphic object", as used herein, refers to any discrete graphic element displayed on the display 102 to represent an object.

Figure 4:
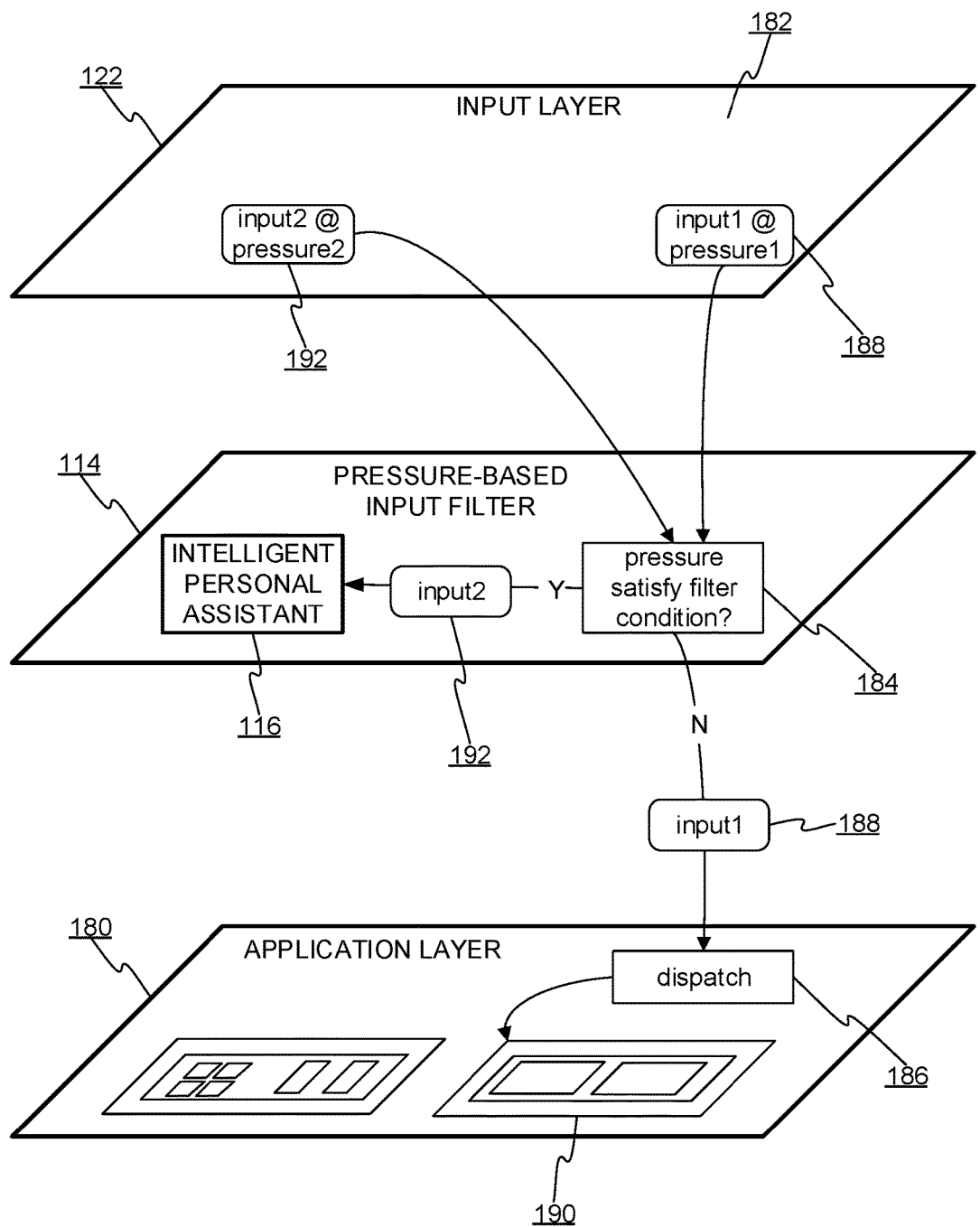
FIG. 4 shows how touch inputs flow through a pressure filter to either be diverted to the IPA or passed through to an application layer.

FIG. 4 shows how touch inputs flow through the pressure filter 114 to either be diverted to the IPA 116 or passed through to an application layer 180. An input handling layer 182 receives low level touch points sensed by the sensing surface 122. After or as the low level touch inputs are mapped to input events in display space, the touch inputs are received and evaluated by the pressure filter 114. The touch inputs might be received as single points, sets of time-stamped points (strokes), or as events such as move events, "up" events, "down" events, or recognized gestures. In whatever form, the touch inputs have associated therewith one or more pressure properties, discussed below. The pressure filter 114 evaluates the pressure properties against a pressure condition 184. If the pressure condition 184 is satisfied, then the corresponding touch input is provided to the IPA 116 but not the application layer 180. If the pressure condition 184 is not satisfied, then the corresponding touch input passes through the pressure filter 114 (bypassing the IPA 116) for ordinary input handling. The ordinary input handling when a touch input bypasses the pressure filter 114 might involve a dispatcher 186 of the windowing system determining which application or window is associated with the touch input and a corresponding event is generated, callback is invoked, message is passed, etc.

When a first touch input 188 is sensed with a first pressure value, the pressure filter 114 evaluates the first pressure value against the pressure condition 184, determines that the pressure condition 184 is not satisfied, and passes the first touch input 188 down to be dispatched to an application 190; the IPA is not activated or involved in handling the first touch input 188. When a second touch input 192 is sensed with a second pressure value, the pressure filter 114 evaluates the second pressure value against the pressure condition, determines that the pressure condition 184 is satisfied, and passes the second touch input 192 to the IPA 116 for potential use in resolving an exophora in a voice command; the application layer 180 does not receive the second touch input 192.

Figure 5:
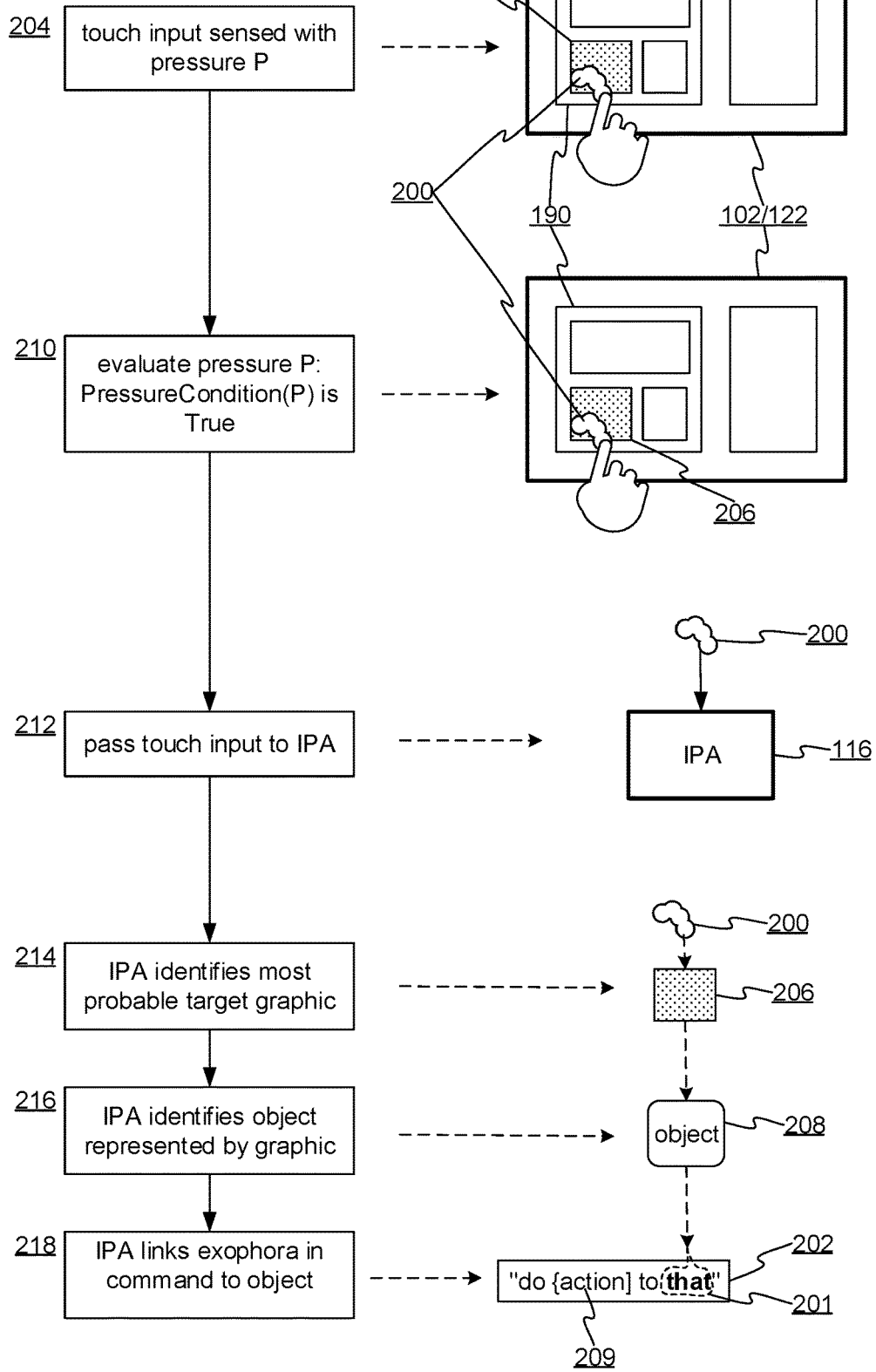
FIG. 5 shows a process for using pressure of a touch input to resolve an exophoric phrase of a voice command.

FIG. 5 shows a process for using pressure of a touch input 200 to resolve an exophoric phrase 201 of a voice command 202. At step 204 the touch input 200 is sensed with pressure P. The touch input 200 is coincident with a graphic object 206 of the application 190. The graphic object 206 represents or corresponds to some underlying object 208 stored on the computing device 100. At step 210 the pressure filter 114 determines whether one or more pressure features of the touch input 200 satisfy the pressure condition 184. Based on such a determination, at step 212 the touch input 200 is passed to and "consumed" by the IPA 116; the application 190 does not directly respond to or handle the touch input 200.

At step 214, the IPA 116 identifies the most probable target graphic. For example, the IPA 116 may select whichever graphic object has the greatest intersection with the touch input 200. Other techniques for step 214 are described below. At step 216, given an identified graphic object 206, the corresponding object 208 is identified. At step 218, the IPA 116 links the exophora 201 to the object 208, thus enabling an action 209 of the voice-inputted command 202 to be carried out for the object 208.

The step 210 of determining whether the pressure condition is satisfied can be implemented in numerous ways. When the touch input 200 is sensed, pressure can be sensed and associated with the touch input 200 by including a pressure value with the one or more points of the touch input 200. Each point might have a pressure value, or each point at a given time interval, or every Nth point, etc. In one embodiment, a function maps the sequence of discrete pressure values to a summary pressure by taking an average of the pressure values, perhaps giving weight to the initial pressure values. Alternatively, an average or maximum of only a first number (or percentage, or time period) of pressure values may be used. Several summary pressure values might be computed for a same touch input. Any mapping, as a function of time or distance of corresponding input points, can be used to generate a single summary pressure value or a sequence of summary pressure values.

The pressure condition for evaluating the one or more pressure values may be as simple as a threshold value or range, a sequence of thresholds (as a function of time or distance) to be satisfied by respective pressure values (or pressure summaries), a rate of pressure change, a sustained pressure for a threshold period of time, a combination of such factors, etc. Generally, the sensed pressure values may be treated as a signal and any signal-processing techniques may be used to characterize the pressure signal and evaluate traits of the signal to determine whether the pressure condition is met. In some embodiments, only an initial portion of a touch input's pressure values are evaluated and the pressures of input points inputted after the initial portion do not affect the decision. The rate of pressure change can also be used as a feature of input to identify user intent. Generally, any pattern of pressure-related features of a touch input can be correlated with the user's intent to invoke the IPA or provide context to the IPA. The rate of pressure change can also influence the threshold values. For instance, pressing more quickly may require a lower threshold than increasing the pressure slowly. The threshold may also be a deviation from the mean for that user (i.e., if a particular user tends to press harder all the time, the thresholds are raised to compensate).

The IPA's understanding of the object or the user can be used to influence the pressure differentiation. For example, summoning the IPA may require less force in situations where the IPA has a high level of relevant information or useful actions about the object, or in situations where the user has invoked the IPA previously for the same object or another object of the same type (e.g., the IPA determines that the user commonly uses the IPA to interact with the user's contacts). Similarly, exceeding a second higher pressure threshold could be used to signal that the user intends to interact with the IPA about this particular object rather than, say, using the force press to summon the IPA to make a more generic inquiry), which the IPA could leverage as additional context when interpreting the request (by weighting contextually relevant interpretations higher than normal).

In some embodiments, feedback may be triggered when the pressure condition is satisfied. This can help the user to understand that the touch input being inputted will have a special status with respect to the IPA. Haptic feedback can be triggered when the pressure condition is met. Visual feedback might be in the form of displaying a graphic representing the touch input. When the pressure condition is met by a touch input, the touch input's path might be displayed as a moving graphic symbol or an extending graphic line (tracing the input) enhanced with effects such as color, transparency, patterns/dashes, or others. Feedback about satisfying the pressure condition might be provided only during a training period or according to a user configuration setting. In some embodiments, "touched" graphic objects might be enhanced, highlighted, etc., to signify that they are potential objects of interest for the IPA. Such graphic signification of objects can also be used to inform the user that the objects are objects that the IPA understands and is able to take useful actions on or provide interesting information about, in effect inviting the user to invoke the IPA.

At steps 212/214, once the touch input begins being handled by the IPA, perhaps as the touch input continues being inputted, feedback might also be provided by modifying the appearance of graphic objects potentially targeted by a touch input that has satisfied the pressure filter condition. Highlighting, shadows, vibratory motion, or other known visual effects may be used to indicate which graphic objects will be considered by the IPA. The appearance of each graphic object coincident with (or proximate to) locations of the touch input might be modified, even if the graphic objects are ultimately not selected and used by the IPA. Such effects should be provided without any functional interaction with the objects represented by the graphic objects. For example, if an icon is highlighted by a pressure-selected touch input, the icon (or the object it represents) should not receive any input events, callbacks, etc. In one embodiment, a continuous touch input stroke only selects graphic objects over portions that satisfy the pressure condition.

Figure 6:
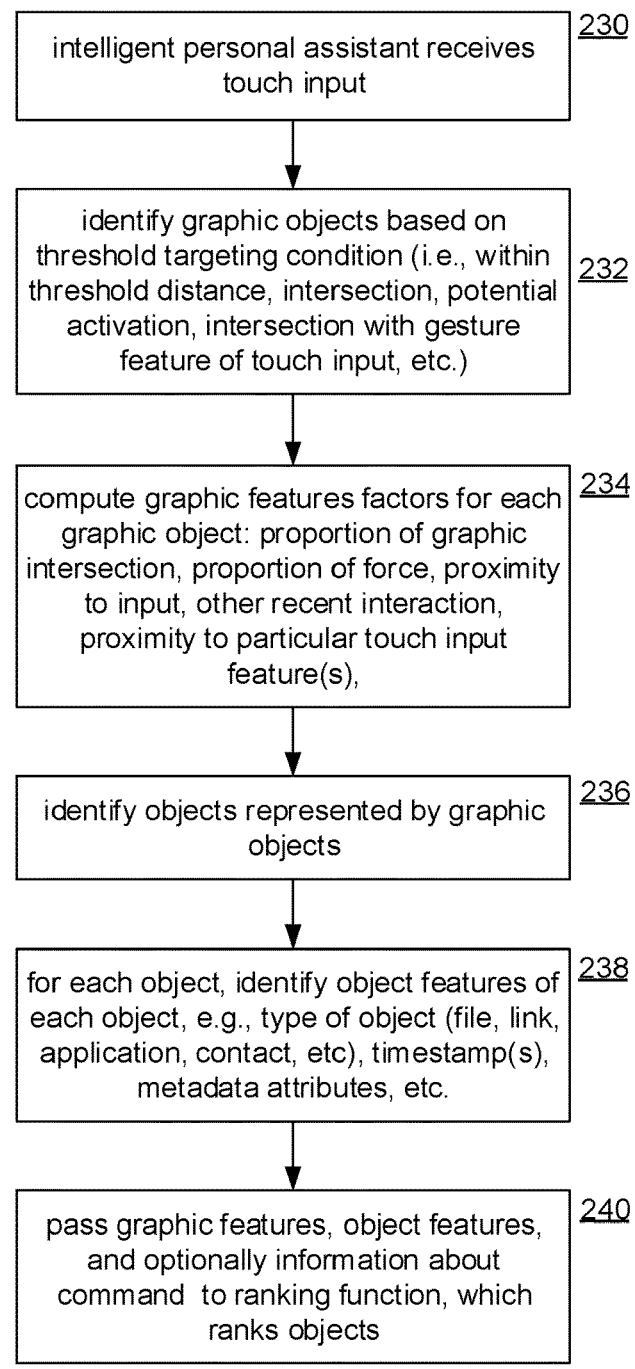
FIG. 6 shows a process for identifying one or more objects for an exophora based on a touch input that is associated with a command recognized through speech recognition.

FIG. 6 shows a process for identifying one or more objects for an exophora based on a touch input that is associated with a command recognized through speech recognition. At step 230 the IPA receives a pressure-filtered touch input. The touch input may be complete or still being inputted. At step 232 the IPA identifies candidate graphic objects based on a threshold target condition. This target condition might be a combination of one or more conditions such as proximity to or intersection with the path of the touch input, proximity or intersection with a feature of the touch input (e.g., a loop, dwell, etc.) intersection with or proximity to a pressure feature of the touch input, etc. In one embodiment, the touch input is passed to the IPA based on an initial pressure, and, as the touch input continues to be inputted and evaluated by the IPA, each time a selection feature (e.g., pressure, shape, etc.) of the touch input is detected the display location of the selection feature is used to potentially select a candidate graphic object on the display, for instance a closest graphic object or any graphic object "under" the selection feature.

At step 234 the IPA uses the identified candidate graphic objects to identify objects represented by the graphic objects. For example, an application icon graphic object might be "dereferenced" to determine which application is represented by the icon. A graphic representing a message in a text-messaging application might lead to the text message object. A tile graphic representing a multimedia object, perhaps in a folder of tiles, might be used to obtain an identifier of the multimedia object. A graphic of a pin or street or point of interest on a map might be traced back to a corresponding map object.

Object identifiers for any type of object managed by the operating system, user shell, applications, etc., can be obtained by walking down through the hierarchy of user interface elements managed by the windowing/operating system. Most windowing systems maintain a hierarchy of graphic objects (user interface elements), typically starting with a root window, with child windows (e.g. applications, graphical user shell), views, sub-views, user controls and various atomic user interface elements at the bottom of the hierarchy. If the IPA has sufficient privilege, the hierarchy can be walked to identify graphic objects and the objects they identify. Incidentally, such a hierarchy can also be used at step 232 when identifying graphic objects, since a touch input or selection feature thereof can potentially map to multiple elements of the hierarchy (e.g., a window, a view, a sub-view, a control, etc.).

Resolving ambiguity in the scope of selection can be challenging. Consider a press on an appointment in a calendar. Technically, the user might be pressing on a text label element or maybe an icon or border graphic in the visual tree. Without further context, the operating system doesn't know whether the semantically meaningful thing (the one to pass to the IPA) is the text label, or the icon, the list item, the entire list, the layout panel, etc. In this example, only the calendaring application has sufficient context to know that for its scenario the semantically meaningful granularity is probably an "appointment" object which has various properties.

There are a variety of ways this problem can be solved. A sufficiently smart IPA could sort through the view hierarchy and infer the right context if the operating system passed it all along. Alternatively, and perhaps more conveniently, the IPA is configured with an API that the application can use to identify and volunteer these semantically meaningful entities that the application determines that the user probably meant and that the IPA can probably act on. In practice, this approach is convenient because a significant amount of the IPA's intelligence/capability probably comes from these applications in the first place (i.e., the application isn't merely identifying relevant objects but also helping the IPA perform actions on those objects). This approach of the application helping the IPA can work in addition to the machine learning/ranking approach described above, especially since realistically not every application developer will do work to integrate with the IPA (also the application doesn't know which command the user is requesting from the IPA). Encapsulating common patterns within UI controls provided by a UI framework can reduce the burden somewhat.

At step 238, given a set of identified candidate objects, a feature set or feature vector for each candidate object may be constructed. A feature set for an object might include information about the types of the object, times related to accessing or modifying the object, metadata attributes, attributes derived from content of the object, display location, etc. Metadata attributes might be derived from system metadata managed by the operating system, analyzing content of the object (e.g., identities of persons derived from face/voice recognition), or other information associated with the object.

At step 240, given a set of candidate objects and respective feature sets/vectors, the IPA computes ranking scores for the objects. Ranking might be performed by a machine learning module that takes into account the feature sets as well as other factors such as current context of the relevant voice command, recent context accumulated by the IPA, elements of the voice command that relate to relevance of different features, and so forth. For example, for a command such as "edit that", the ranking function might have a bias for document-type objects. A command such as "tell me how to get there" might increase the weight of map-related features in feature sets. If a command includes a pluralistic exophora then the ranking function might increase the scores of objects that are close together or share feature values such as a same object type or inclusion within a same container. A clustering algorithm might be incorporated into the ranking process when a pluralistic exophora is present. At the end of step 240, the object or objects with the highest scores are used in place of the exophora in the relevant voice command.

While complex heuristics and learning algorithms can be used for mapping a touch input to an object that an exophora refers to, simpler techniques may be used. For example, a touch input may be filtered based on having a sufficient pressure, a graphic object that first most intersects (or has the most intersection with) the touch input is selected, and the object that is represented by the graphic object is used in place of the exophora.

Although the IPA 116 is described above as determining which object a filtered touch input has identified, another module might perform this step. For example, the pressure filter might perform the steps of FIG. 6, pass an object identifier to the IPA 116, and then the IPA 116 determines that the identified object is suitable for the corresponding voice command before using it to carry out the voice command. Similarly, the pressure filter might perform the step 236 of identifying the graphic objects selected by a filtered touch input, pass the graphic objects to the IPA, and the then the IPA determines which objects will be used in place of an exophora. However, the IPA has information about the relevant voice command and can use that information to help decide which object is a best fit for the command.

Figure 7:
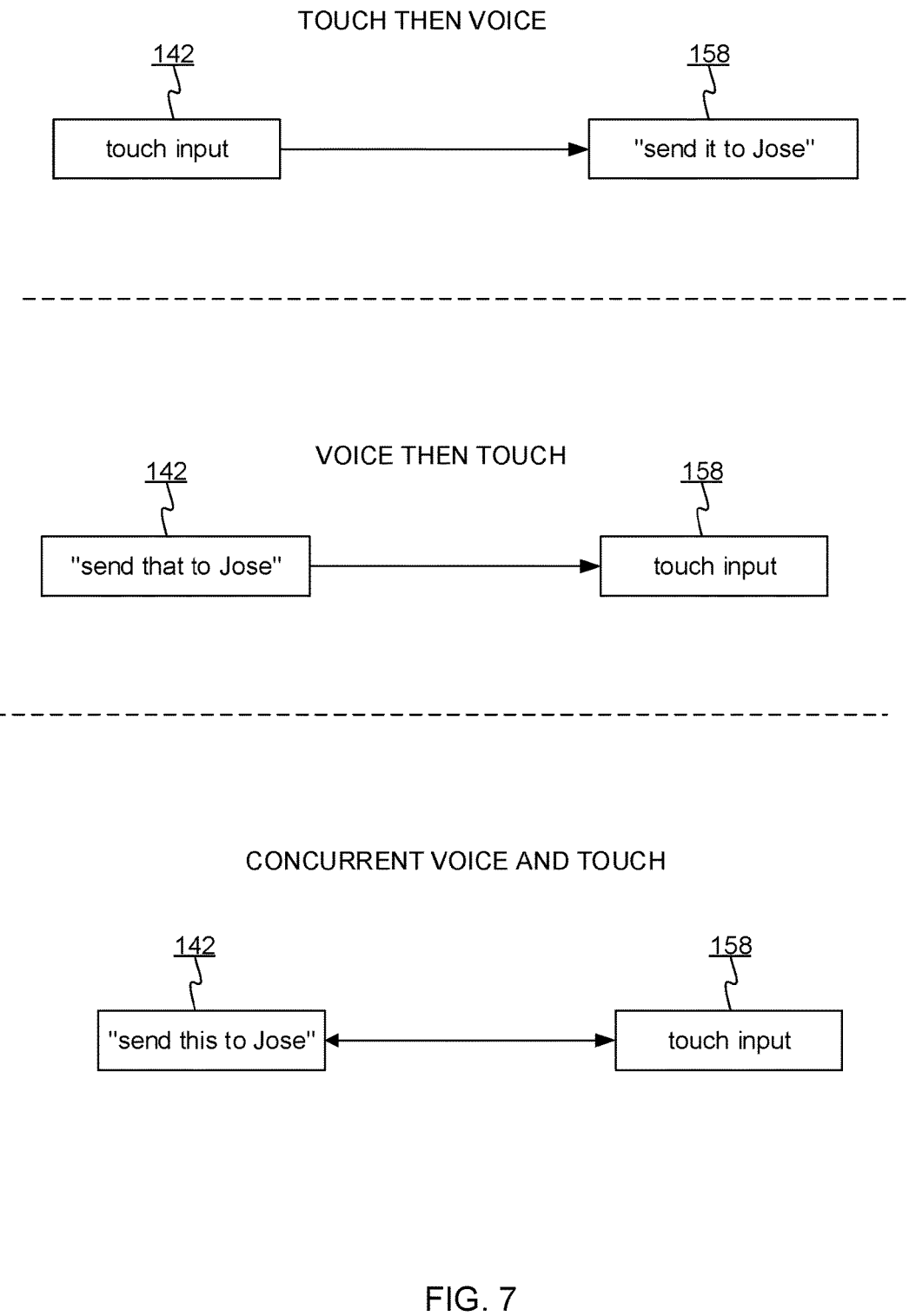
FIG. 7 shows how voice commands and touch inputs for same can vary in their relative chronological order.

FIG. 7 shows how voice commands and touch inputs for same can vary in their relative chronological order. The use of pressure-filtered touch inputs for command completion can be part of an ongoing "dialogue" between the user and the IPA. In the top example of FIG. 7, a filtered touch input 142 is received by the IPA. If the IPA has no unresolved exophora, then the IPA awaits a voice command and the attempts to use the touch input to resolve the exophora. As shown in the middle example in FIG. 7, a voice command 142 might be inputted and recognized first, and if the IPA does not have any corresponding touch input for selecting an object, then the IPA waits for the user to provide a touch input 158. In the lower example in FIG. 7, the voice command and touch input 158 are at least partly inputted at the same time.

Because an IPA may handle a series of voice commands, it may be necessary to determine which touch inputs (or touch-selected objects) are associated with which voice commands. Among other things, linguistic attributes of the voice commands can be used to resolve this association ambiguity. For example, the tense of a pro-noun phrase might indicate whether a past, present, or future touch input is intended. Plurality/singularity of an exophora might also be used; touch inputs that select multiple objects should tend to associate with plural exophoras, and touch inputs that select single objects should tend to associate with singular exophoras. Which voice command associates with which touch input can also be determined based on whether there is an unresolved exophora. If there is not, then the touch input associates with the next voice command that has an exophora. If there is, then the touch input associates with the voice command having the unresolved exophora.

A history of objects that have been used as context by IPA can be stored to inform future decisions. In some cases, the same touch-selected object may be referenced by multiple exophoras in multiple respective voice commands. It might be inferred that the presence of "that" or "it" in multiple discrete commands each refer to the same object, for instance if the commands are determined to be sufficiently related functionally, topically and/or chronologically.

Figure 8:
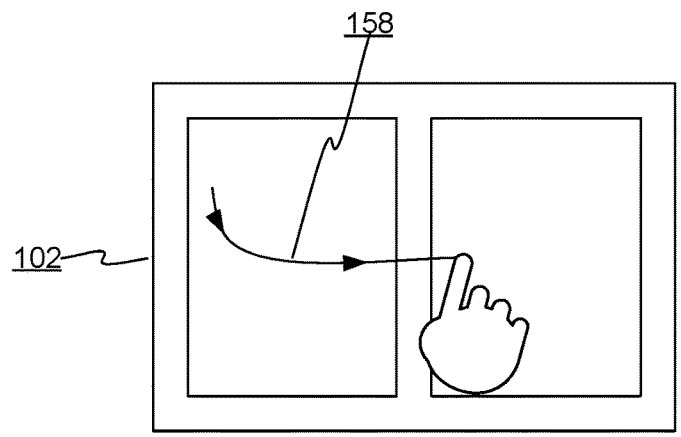
FIG. 8 shows how certain features of a pressure-filtered touch input can be used to help resolve exophoras in a voice command.
Figure 8:
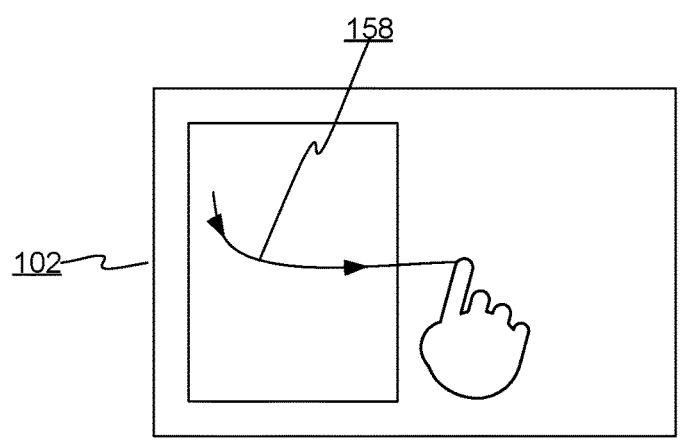

FIG. 8 shows how certain features of a pressure-filtered touch input 158 can be used to help resolve exophoras in a voice command. When a voice command includes a direction such as "over there", the direction of the corresponding filtered touch input can be analyzed to determine where "there" refers to. A voice command 142 to "copy this over here" can resolve both "this" as well as "over there", which may be a direction of the touch input or an endpoint of the touch input. Not only may filtered touch inputs be used to resolve exophoric references, the filtered touch inputs can be used to resolve other non-specific elements of a voice command, including directions, locations, orderings, etc. In general, any features of the touch input, e.g., pressure, geometry, speed, dwell times, etc., can be used to provide parameters to any of the steps for processing the touch inputs, including graphic object selection, object selection, command interpretation, command execution, and so on.

Figure 9:
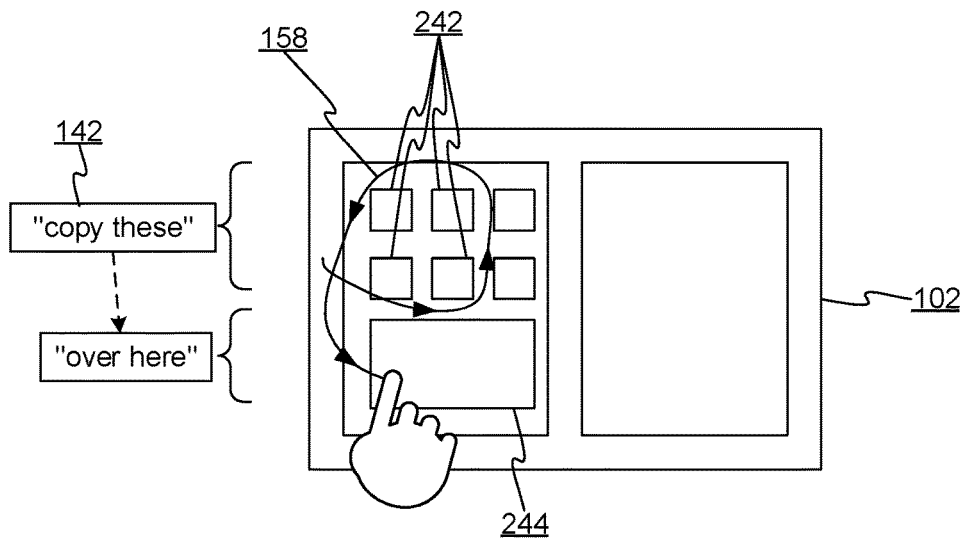
FIG. 9 shows examples of resolving pluralistic exophoras.
Figure 9:
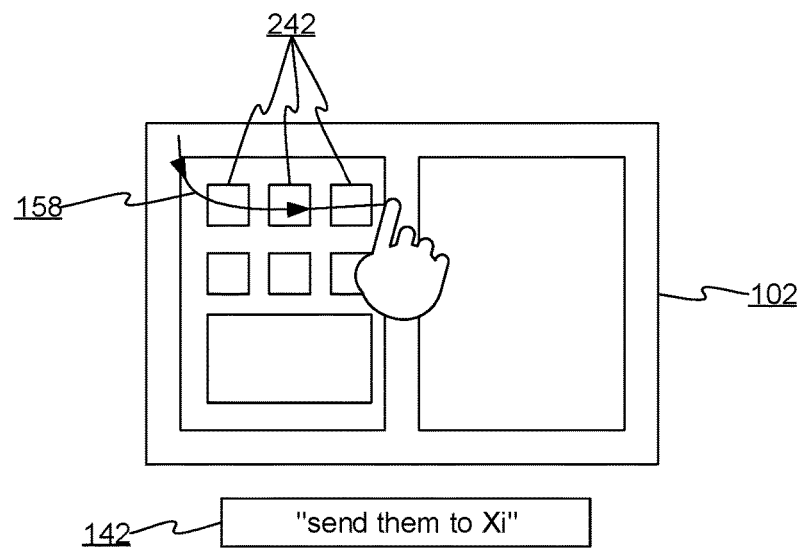

FIG. 9 shows examples of resolving pluralistic exophoras. In the top example, a filtered touch input 158 selects a set of objects 242 based on a loop feature of the input. Because the exophora refers to a plural set of objects, the loop of the touch input is recognized as a selection feature and objects encompassed by the loop are identified as referenced objects. The non-specific locational phrase "over here" is resolved to a location or direction of the touch input and the command is carried out accordingly (the four small square objects 242 are copied to the container 244 below). Similarly, if the command was "copy these to that", "that" could be resolved to the container 244 or other object where the touch input ended or pointed to upon ending. In the example below, the plural form of the exophora "them" informs how the IPA ranks the objects potentially selected by the touch input and three objects 242 are selected to be associated with "them".

In cases where a touch input is diverted to the IPA prior to a voice command, after the IPA identifies an object according to the touch input, the IPA can take actions in anticipation of further action by the user. The feature set or metadata of the object gathered by the IPA can guide how interaction with the object is facilitated. For example, if the object is a first type (e.g., a document), then a set of corresponding actions such as "edit", "email" and "print" might be determined to be relevant. If the object is a media object, then actions such as "play", "share" or others might be identified. The same technique of exposing information about an object can be triggered when the recent voice commands lack any exophoras. This can allow the user to use the IPA to carry out non-exophoric commands for one purpose while concurrently using the IPA to discover information about objects or candidate actions to perform on objects. Features of the filtered touch inputs can be used to shape the type of information that the IPA seeks. For example, a short pressure dwell might cause the IPA to show potential actions for the object and a long pressure dwell might cause the IPA to show metadata about the object.

Figure 10:
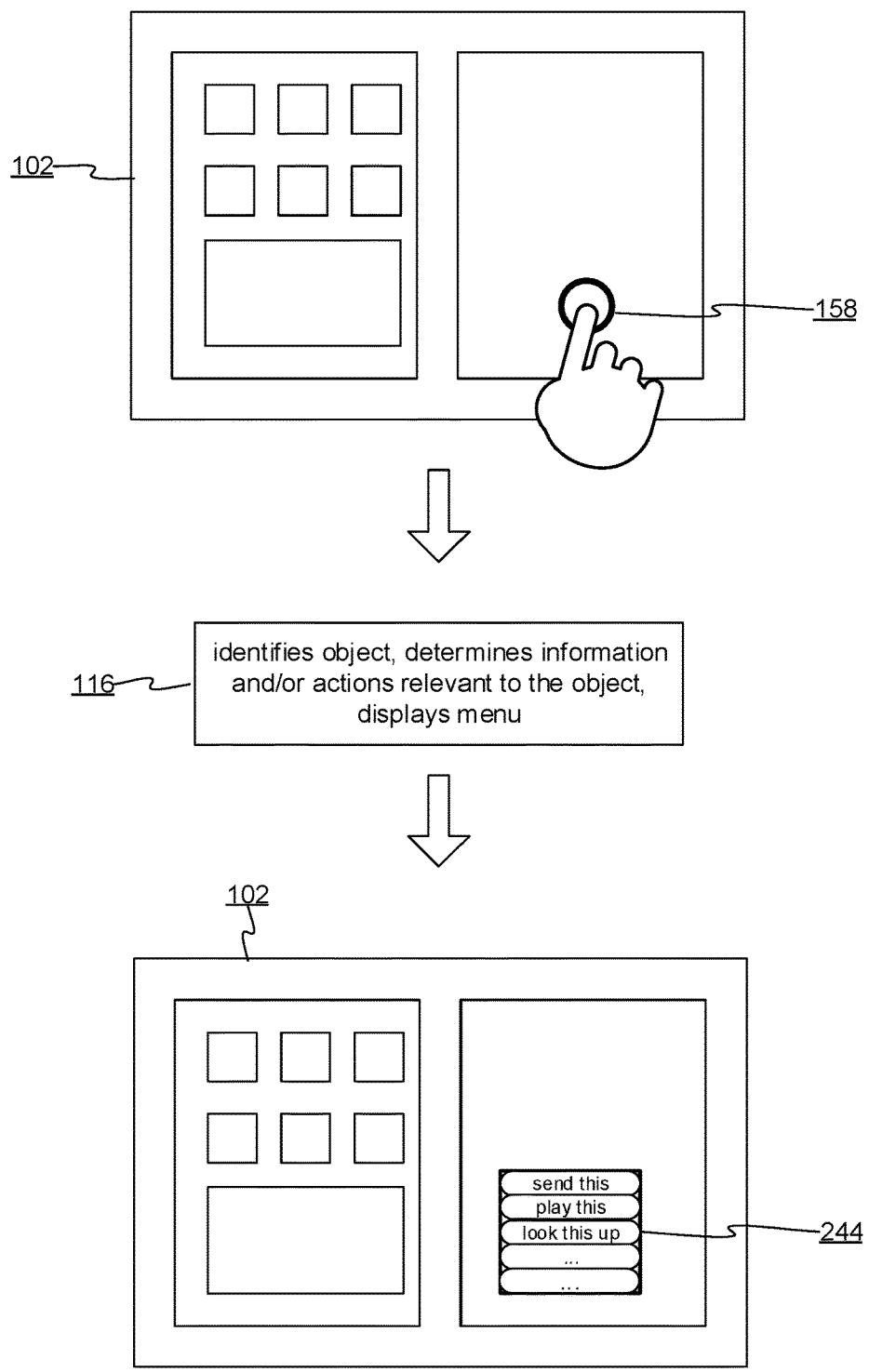
FIG. 10 shows an embodiment where the IPA uses a touch input hint to provide contextual insights about an object.

FIG. 10 shows an embodiment where the IPA uses a touch input hint to provide contextual insights about an object. A dwell touch input 158 with an appropriate activating pressure trait is diverted to the IPA 116. The IPA identifies the object represented by the graphic selected by the touch input. Properties of the object are used to populate a context or pop-up menu 244 with potential actions and/or information relevant to the object. If a voice command subsequently includes an exophoric reference or selects one of the menu items, then the menu 244 is dismissed. Other forms of transient user interface may be used, such as text input controls, buttons, toolbars, or others.

It should be appreciated that the pressure-based activation of the IPA can be useful even without a voice command or an exophoric resolution. By signaling display locations to the IPA through a force-based input channel, the considerable capabilities of an IPA—such as the ability to gather information about objects—can be directed to objects represented on the display. By pressure-touching an object's graphic representation on the display, a resulting association between the object and the IPA enables a wide range of user experiences, including the display of transient user interface elements for displaying object-relevant information or actions provided by the IPA, the building of context that can be used for interpreting voice commands, and so forth. Moreover, the use of a pressure filter or condition to differentiate touch inputs that are intended for the IPA avoids input association and interpretation conflicts with respect to the software managing the underlying user interface comprised of the graphic objects. The underlying ordinary user interface such as a graphical user shell, applications, etc. can continue to function as expected without modification to accommodate the IPA.

Some embodiments may be implemented without a menu or other affordance and without attempting to resolve exophoric phrases. Generally, IPAs are already designed to use a rich context to interpret and execute commands. Expanding that context with user interface context can expand the context-driven functionality of most IPAs.

The pressure-triggered input modality described above can complement other aspects of the IPA. For example, when a touch input is determined to satisfy the pressure condition that triggers an interaction with the IPA, the IPA may enter an active-listening mode for speech commands, obviating the need for an interaction with the computing device specifically for the purpose of putting the IPA in a listening mode. In other words, if a touch input's pressure diverts the touch input (or an object selected thereby) to the IPA, the IPA/device can also respond to the touch input or object by beginning to capture audio from the microphone and interpreting any detected voice input command. An interaction such as "share this with my spouse" in combination with a pressure-filtered touch input allows seamless interaction, through the IPA, with an object represented on the display of the relevant computing device.

Using some of the techniques described above, touch inputs can be used for performing speech recognition in situations where the user doesn't use a phrase like "this." For example, the user may verbally reference the touched object by its displayed name, which may not otherwise be in the IPA's speech grammar/vocabulary.

Figure 11:
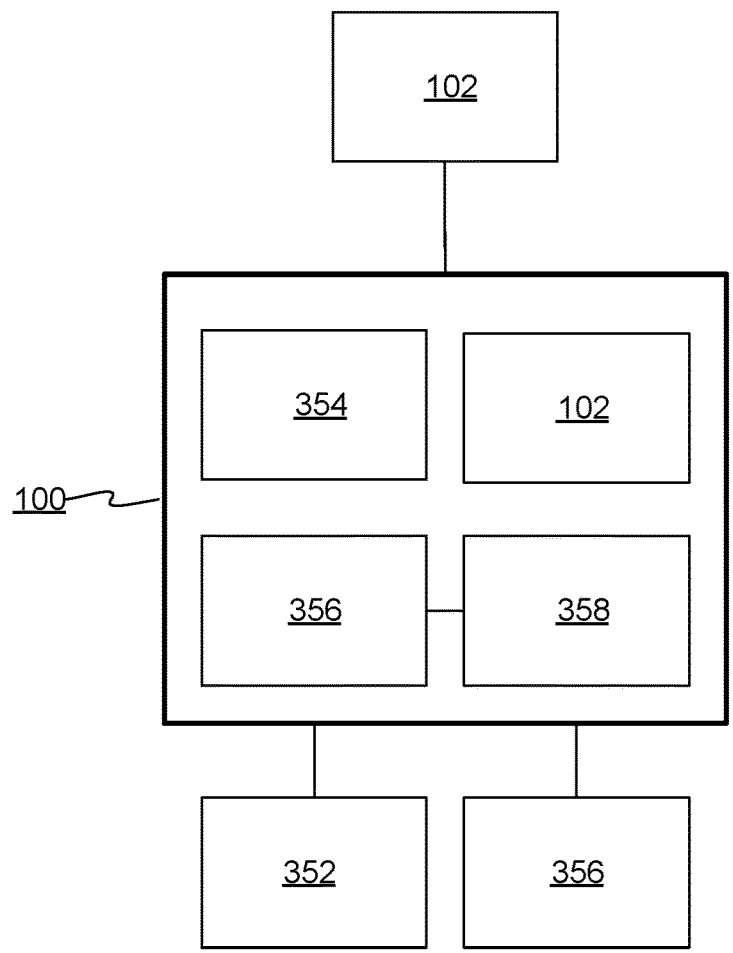
FIG. 11 shows details of the computing device on which embodiments described above may be implemented.

FIG. 11 shows details of the computing device 100 on which embodiments described above may be implemented. The technical disclosures herein will suffice for programmers to write software, and/or configure reconfigurable processing hardware (e.g., field-programmable gate arrays), and/or design application-specific integrated circuits (application-specific integrated circuits), etc., to run on the computing device 100 to implement any of the features or embodiments described herein.

The computing device 100 may have one or more displays 102, a network interface 354 (or several), as well as storage hardware 356 and processing hardware 358, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 356 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 100 may cooperate in ways well understood in the art of machine computing. In addition, input devices may be integrated with or in communication with the computing device 100. The computing device 100 may have any form-factor or may be used in any type of encompassing device. The computing device 100 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 358. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising storage hardware, processing hardware, a display, and a touch input device that senses touch inputs and force components thereof, the method performed by the processing hardware executing instructions stored in the storage hardware, the method comprising:

executing an intelligent personal assistant (IPA) on the computing device, the executing comprising using speech recognition to recognize commands inputted through a microphone of the computing device and invoking respective operations for the recognized commands;

executing an application comprised of a graphical user interface, the executing including displaying the graphical user interface, the graphical user interface comprising graphic objects representing objects stored on the computing device, the application configured to respond to touch inputs that are directed to the graphical user interface;

receiving the touch inputs respectively comprised of locations, the touch inputs associated with the force components, respectively, each force component corresponding to a measure of force with which a corresponding touch input was inputted via the touch input device;

evaluating the force components against a force condition, wherein
  (i) each time the force condition is determined to be satisfied by an evaluated force component, based on such determination, a corresponding touch input is passed to the IPA which uses the touch input to identify a target object according to a location of a graphic representation of the target object in the graphical user interface and according to the touch input corresponding to the evaluated force component that satisfied the force condition, and
  (ii) each time the force condition is determined to not be satisfied by an evaluated force component, the touch input is provided to the application based on a location of the touch input and the application responds to the provided touch input.

2. A method according to claim 1, the method further comprising:

determining that an exophoric phrase is present in a given command being handled by the IPA; and based on the determination of the presence of the exophoric phrase in the command, executing the command with reference to the target object.

3. A method according to claim 1, wherein each touch input determined to satisfy the force condition is not passed to the application, and each touch input determined to not satisfy the force condition is not used to identify a target object by the IPA.

4. A method according to claim 1, further comprising, responding, by the IPA, to identification of the target object by the IPA displaying a user interface element, wherein content of the user interface element is selected by the IPA based on one or more features of the target object.

5. A method performed by a computing device comprising storage hardware, processing hardware, a display, and a touch input device that senses touch inputs and force components thereof, the method performed by the processing hardware executing instructions stored in the storage hardware, the method comprising:

executing an intelligent personal assistant (IPA) on the computing device, the executing comprising using speech recognition to recognize commands inputted through a microphone of the computing device and invoking respective operations for the recognized commands;

executing an application comprised of a graphical user interface, the executing including displaying the graphical user interface, the graphical user interface comprising graphic objects representing objects stored on the computing device, the application configured to respond to touch inputs that are directed to the graphical user interface;

receiving the touch inputs respectively comprised of locations, the touch inputs associated with the force components, respectively, each force component corresponding to a measure of force with which a corresponding touch input was inputted via the touch input device:

evaluating the force components against a force condition, wherein
  (i) each time the force condition is determined to be satisfied by an evaluated force component, based on such determination, a corresponding touch input is passed to the IPA which uses the touch input to identify a target object according to a location of a graphic representation of the target object in the graphical user interface and according to the touch input corresponding to the evaluated force component that satisfied the force condition, and
  (ii) each time the force condition is determined to not be satisfied by an evaluated force component, the touch input is provided to the application and the application responds to the provided touch input, and wherein a given touch input corresponds to two candidate objects and the method further comprises the IPA and/or the application determining which of the two candidate objects will be the target object.

6. A method performed by a computing device comprising storage hardware, processing hardware, a display, and a touch input device that senses touch inputs and force components thereof, the method performed by the processing hardware executing instructions stored in the storage hardware, the method comprising:

executing an intelligent personal assistant (IPA) on the computing device, the executing comprising using speech recognition to recognize commands inputted through a microphone of the computing device and invoking respective operations for the recognized commands:

executing an application comprised of a graphical user interface, the executing including displaying the graphical user interface, the graphical user interface comprising graphic objects representing objects stored on the computing device, the application configured to respond to touch inputs that are directed to the graphical user interface:

receiving the touch inputs respectively comprised of locations, the touch inputs associated with the force components, respectively, each force component corresponding to a measure of force with which a corresponding touch input was inputted via the touch input device:

evaluating the force components against a force condition, wherein
  (i) each time the force condition is determined to be satisfied by an evaluated force component, based on such determination, a corresponding touch input is passed to the IPA which uses the touch input to identify a target object according to a location of a graphic representation of the target object in the graphical user interface and according to the touch input corresponding to the evaluated force component that satisfied the force condition, and
  (ii) each time the force condition is determined to not be satisfied by an evaluated force component, the touch input is provided to the application and the application responds to the provided touch input, and, wherein the force condition is used to differentiate, among the touch inputs, between first touch inputs that are to be used to identify objects by the IPA and second touch inputs that are not to be used by the IPA to identify objects.

7. A method according to claim 6, wherein the force condition comprises at least a force threshold value and the evaluating comprises comparing the force threshold value to the force components.

8. A computing device comprising:
processing hardware;
a microphone;
a touch and force sensing display that senses touch inputs and provides respective measures that correspond to forces of the touch inputs; and
storage hardware storing instructions configured to cause the processing hardware to perform a process comprising:
  executing an application comprising an object displayed by the computing device;
  receiving a voice command inputted through the microphone;
  receiving a first touch input corresponding to a first force measure;
  determining whether the force measure satisfies a force condition;
  executing first logic when the determining determines that the force measure satisfies the force condition, the first logic, when executed, associating the voice command with the object, and executing the voice command based on the association between the voice command and the object; and
  executing second logic when the determining does not determine that the force measure satisfies the force condition, the second logic, when executed, providing the touch input to the application based on a location of the touch input.

9. A computing device according to claim 8, wherein the associating the voice command with the object comprises identifying a graphic object displayed by the display according to the touch input, and identifying the object based on the identifying of the graphic object.

10. A computing device according to claim 8, the process further comprising determining a display region defined by the touch input and identifying a plurality of objects according to the region.

11. A computing device according to claim 8, wherein the voice command comprises an exophoric phrase and the word "here" or "there", the process further comprising resolving the exophoric phrase as referring to the object and resolving the word "here" or "there" according to a feature of the touch input.

12. A computing device according to claim 11, wherein the storage stores an intelligent personal assistant (IPA), and wherein the IPA receives a reference to the object and generates context according to the object, the context used by the IPA to interpret and/or execute voice commands being handled by the IPA, the IPA configured to invoke applications on the computing device to execute the voice commands.

13. A computing device according to claim 12, wherein the IPA is configured to display a user interface element that comprises graphic indications of a plurality of actions or information items determined by the IPA to be relevant based on one or more properties of the object.

14. A computing device according to claim 8, the process further comprising displaying a user interface on the display, wherein the touch input is coincident with the user interface on the display, wherein the user interface is configured to respond to touch inputs, and wherein whether the touch input is received by the user interface depends on whether the touch input satisfies a threshold force condition, the threshold force condition controlling whether touch inputs coincident with the user interface are received by the user interface.

15. A method performed by a computing device comprising storage hardware, processing hardware, a display, and a touch input device that senses touch inputs and force components, the method performed by the processing hardware executing instructions stored in the storage hardware, the method comprising:
    executing an intelligent personal assistant (IPA) on the computing device, the executing comprising using speech recognition to recognize commands inputted through a microphone of the computing device;
    receiving a touch input comprised of a pressure component and a location relative to the display, the pressure component corresponding to a pressure value sensed by the touch input device while sensing input points of the touch input; and
    determining whether or not to activate the IPA by determining whether the pressure component of the touch input satisfies a pressure condition, wherein the instructions are configured to:
        respond to a determination that the pressure component of the touch input satisfies the pressure condition by activating the IPA and providing the touch input to the IPA, and
        respond to a determination that the pressure component of the touch input does not satisfy the pressure condition by, instead of activating the IPA and providing the touch input to the IPA, providing the touch input to an application based on the application being associated with the location of the touch input.

16. A method according to claim 15, wherein the IPA interprets the command by resolving an exophoric phrase in the command.

17. A method according to claim 16, wherein the command specifies an action or query to be invoked by the IPA, and wherein the IPA invokes the action on the object or queries for information about the object.

18. A method according to claim 15, wherein the object comprises a file system object, an object managed by an application installed on the computing device, or a link to a network resource.

19. A method according to claim 15, wherein the activating the IPA comprises causing the IPA to begin analyzing audio input received through a microphone of the computing device.

20. A method according to claim 15, wherein the method is performed by an operating system of the computing device.

* * * * *